United States Patent
Getz et al.

(10) Patent No.: US 9,339,008 B1
(45) Date of Patent: May 17, 2016

(54) HAY BALE HOLDER

(71) Applicants: Russell B. Getz, Robesonia, PA (US); Mary E. Getz, Robesonia, PA (US)

(72) Inventors: Russell B. Getz, Robesonia, PA (US); Mary E. Getz, Robesonia, PA (US)

( * ) Notice: Subject to any disclaimer, the term of this patent is extended or adjusted under 35 U.S.C. 154(b) by 226 days.

(21) Appl. No.: 14/090,701

(22) Filed: Nov. 26, 2013

Related U.S. Application Data

(60) Provisional application No. 61/886,359, filed on Oct. 3, 2013.

(51) Int. Cl.
*A01K 1/10* (2006.01)
*A01K 5/01* (2006.01)

(52) U.S. Cl.
CPC ........................ *A01K 5/01* (2013.01)

(58) Field of Classification Search
CPC ......... A01K 5/00; A01K 5/01; A01K 5/0107; A01K 1/10; A01K 1/105
USPC ............. 119/51.01, 52.1, 53, 57, 57.1, 57.92, 119/58, 60, 61.1, 61.2, 61.3; 414/24.5, 25
See application file for complete search history.

(56) References Cited

U.S. PATENT DOCUMENTS

| | | | |
|---|---|---|---|
| 376,529 A | 1/1888 | Kline | |
| 727,925 A | 5/1903 | Faulkner | |
| 1,090,286 A * | 3/1914 | Crowell | A01K 1/10 119/60 |
| 3,885,524 A * | 5/1975 | Gregory | A01K 1/10 119/482 |
| 4,722,302 A * | 2/1988 | Gee, Jr. | A01K 5/0107 119/60 |
| 4,844,424 A | 7/1989 | Knudslien | |
| 4,930,449 A * | 6/1990 | Harton | A01K 5/01 119/60 |
| 4,976,222 A | 12/1990 | Cooke | |
| 5,509,377 A | 4/1996 | Franklin | |
| 6,006,696 A * | 12/1999 | Mann | A01K 1/10 119/60 |
| 6,431,117 B1 * | 8/2002 | Rauch | A01K 5/01 119/58 |
| 7,895,974 B2 | 3/2011 | Brickell | |
| 8,757,093 B1 * | 6/2014 | Wickliffe | A01K 5/01 119/58 |
| 2008/0110403 A1* | 5/2008 | Lerner | A01K 5/01 119/58 |
| 2010/0212597 A1* | 8/2010 | Wolfe | A01K 5/0107 119/58 |
| 2011/0253053 A1* | 10/2011 | Kurtz | A01K 5/01 119/60 |

* cited by examiner

*Primary Examiner* — Trinh Nguyen
(74) *Attorney, Agent, or Firm* — Robert C. Montgomery; Montgomery Patent & Design

(57) ABSTRACT

A hay bale holder is provided having a shelter that selectively positions a chain link enclosure to hold a large hay bale. Openings in the fencing allow animals to remove portions of hay from a comfortable height without removing too much at once. The apparatus applies a spring tension to the chain link fencing allowing the fence to automatically reduce in diameter as the hay bale is consumed.

18 Claims, 10 Drawing Sheets

US 9,339,008 B1

HAY BALE HOLDER

RELATED APPLICATIONS

The present invention was first described in and claims the benefit of U.S. Provisional Application No. 61/886,359, filed Oct. 3, 2013, the entire disclosures of which are incorporated herein by reference.

FIELD OF THE INVENTION

The present invention relates to a shelter that selectively positions a chain link enclosure that which holds and dispenses a large round hay bale.

BACKGROUND OF THE INVENTION

Keeping farm animals, such as horses, cows, goats, and the like, is a never-ending task, requiring one to constantly feed, groom, and clean-up after their animal charges. Many of these animals eat baled hay as their primary food. However, much of the food ends up on the floor, and becomes trampled, and thus wasted. This quickly becomes costly when premium feed such as alfalfa hay is concerned. While the user can give the animal a little amount of hay at a time to help reduce waste, it quickly becomes a time-consuming effort to continually replenish the feed trough. Additionally, such action exposes the animal care giver to possible injury from trampling, kicking, or even biting from certain animals, due to their close proximity to the feeding animal. Accordingly, there exists a need for a means by which farm-type animals can be fed hay-style feed, without waste or other disadvantages as described above.

SUMMARY OF THE INVENTION

The disadvantages of the prior art are overcome by the present invention in providing a hay bale holder having a shelter that selectively positions a chain link enclosure to hold a large hay bale. Openings in the fencing allow animals to remove portions of hay from a comfortable height without removing too much at once. The present invention includes a wind-up assembly that applies a spring tension to the chain link fencing allowing the fence to automatically reduce in diameter as the hay bale is consumed. In this manner, the present invention allows for the feeding of baled type food to almost any type animal without waste of the food, in a manner which is quick, easy, and effective.

BRIEF DESCRIPTION OF THE DRAWINGS

The advantages and features of the present disclosure will become better understood with reference to the following more detailed description and claims taken in conjunction with the accompanying drawings, in which like elements are identified with like symbols, and in which:

Figure 1:
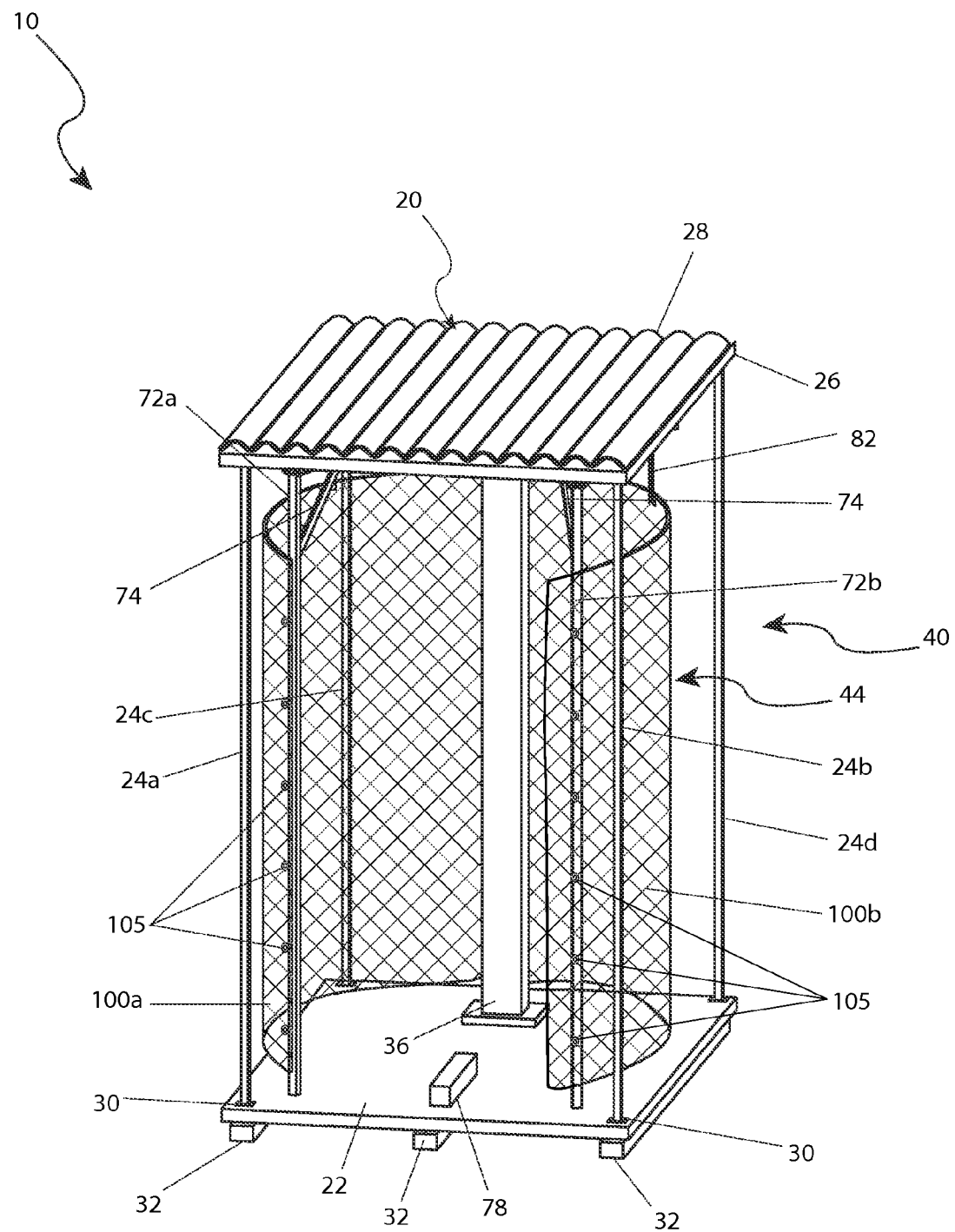
FIG. 1 is a front perspective view of a hay bale holder 10 depicting an empty state, according to a preferred embodiment of the present invention.

DESCRIPTIVE KEY 10 hay bale holder
20 shelter assembly
22 floor platform
24a first support post
24b second support post
24c third support post
24d fourth corner post
26 roof platform
28 roof covering
30 post foot
32 spacer
36 stop post
38 first hinge
40 hay supporting assembly
44 fence assembly
50 wind-up torsion tube assembly
51 torsion tube
52a first fastener plate
52b second fastener plate
53 torsion spring
54a first shaft collar
54b second shaft collar
55 locking mechanism plate
56 shaft
57 upper bearing
58 lower bearing
59 centering disc
60 sprocket
62 pin
64a locking lever arm
64b lever arm fastener
66 tension spring
67a first spring post
67b second spring post
68 cable pulley
70a first rotating support arm
70b second rotating support arm
72a first latch post
72b second latch post
74 brace member
75a first sliding plate
75b second sliding plate
76 slot 78 stationary block
80 lateral support bar
81 stationary support arm
82 hook assembly
83 offset block
84a third rotating support arm
84b fourth rotating support arm
86 second hinge
87 vertical member
88 hook
90 winch assembly
91 winch bracket
92 cable
94 winch pulley
95 locking lever
96 handle
97 alignment pulley
98 pulley bracket
100a first fence section
100b second fence section
105 fastener
107 latching clip
110 hay/bale

DETAILED DESCRIPTION OF THE PREFERRED EMBODIMENT

In accordance with the invention, the best mode is presented in terms of the described embodiments, herein depicted within FIGS. 1 through 8b. However, the disclosure is not limited to the described embodiments and a person skilled in the art will appreciate that many other embodiments are possible without deviating from the basic concept of the disclosure and that any such work around will also fall under its scope. It is envisioned that other styles and configurations can be easily incorporated into the teachings of the present disclosure, and only certain configurations have been shown and described for purposes of clarity and disclosure and not by way of limitation of scope.

It can be appreciated that, although such terms as first, second, etc. may be used herein to describe various elements, these elements should not be limited by these terms. These terms are only used to distinguish one (1) element from another element. Thus, a first element discussed below could be termed a second element without departing from the scope of the present invention. In addition, as used herein, the singular forms "a", "an" and "the" are intended to include the plural forms as well, unless the context clearly indicates otherwise. It also will be understood that, as used herein, the term "comprising" or "comprises" is open-ended, and includes one (1) or more stated elements, steps or functions without precluding one (1) or more unstated elements, steps or functions. Relative terms such as "front" or "rear" or "left" or "right" or "top" or "bottom" or "below" or "above" or "upper" or "lower" or "horizontal" or "vertical" may be used herein to describe a relationship of one (1) element, feature or region to another element, feature or region as illustrated in the figures. It should be understood that these terms are intended to encompass different orientations of the device in addition to the orientation depicted in the figures. It should also be understood that when an element is referred to as being "connected" to another element, it can be directly connected to the other element or intervening elements may be present. In contrast, when an element is referred to as being "directly connected" to another element, there are no intervening elements present. It should also be understood that the sizes and relative orientations of the illustrated elements are not shown to scale, and in some instances they have been exaggerated for purposes of explanation.

The present invention describes a hay bale holder (herein described as the "apparatus") 10, which provides for the feeding of baled hay-type food 110 to farm-type animals. The apparatus 10 utilizes a weather-resistant shelter assembly 20 that encloses and protects a hay supporting assembly 40. The hay supporting assembly 40 comprises a fence assembly 44 that includes two (2) vertically-orientated fencing sections 100a, 100b which wrap horizontally around a standard large-round-bale of hay 110. As the hay 110 is consumed by farm animals through openings in the fence sections 100a, 100b, a wind-up torsion tube assembly 50 provides constant tension upon the fencing sections 100a, 100b to hold them against the bale of hay 110 to support the hay 110 and reduce wasted feed.

Figure 2:
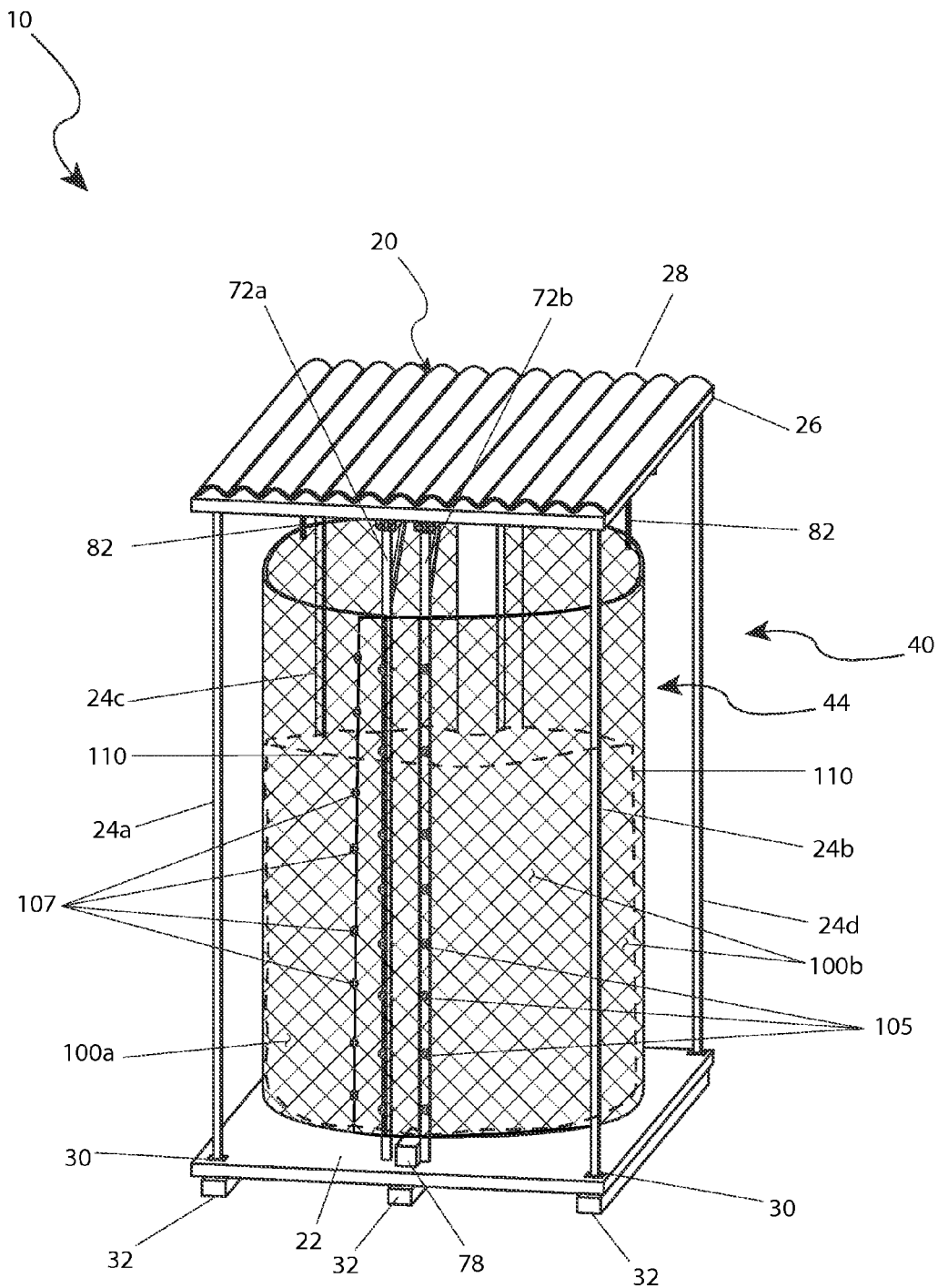
FIG. 2 is a front perspective view of the hay bale holder 10 depicting a loaded state, according to a preferred embodiment of the present invention.

Referring now to FIGS. 1 and 2, front perspective views of the apparatus 10 depicting empty and loaded states, according to a preferred embodiment of the present invention, are disclosed. The apparatus 10 comprises a shelter assembly 20 which comprises a wooden floor portion 22, a first support post 24a, a second support post 24b, a third support post 24c, a fourth support post 24d, a roof platform 26, and a roof covering 28 such as metal or fiberglass corrugated roofing or equivalent material. The support posts 24a, 24b, 24c, 24d are mounted to and extend vertically between respective corner portions of the rectangular floor 22 and roof platform 26 portions. Each support post 24a, 24b, 24c, 24d comprises a vertical length of structural steel tubing having a rectangular foot portion 30 welded perpendicularly to both end portions, thereby providing an attachment means to respective floor 22 and roof platform 26 portions using a plurality of fasteners 105. The floor portion 22 is envisioned to provide a plurality of spacers 32 envisioned to comprise four by-four lumber with end portions cut at a sharp angle, attached along a bottom surface using screws or nails, to allow the apparatus 10 to be pulled and moved using a tractor or similar means to transport the apparatus 10.

Along with the first and second fence sections 100a and 100b, the hay supporting assembly 40 further comprises a stop post 36, a wind-up torsion tube assembly 50, a first rotating support arm 70a, a second rotating support arm 70b, a third rotating support arm 84a, a fourth rotating support arm 84b, a lateral support bar 80, and a pair of stationary support arms 81. The rotating support arms 70a, 70b, 84a, 84b comprise respective features which support and contain the hay/bale 110 within the hay supporting assembly 40 as the wind-up torsion tube assembly 50 provides a means to wind the fence sections 100a, 100b together, as the diameter of the hay/bale 110 reduces during consumption. It is envisioned that the fence sections 100a, 100b be made using chain-link fencing material or equivalent, being made using approximately nine (9) gauge wire and having openings sufficient in size so as to allow a farm animal to feed through.

The stop post 36 comprises similar construction as the support posts 24a, 24b, 24c, 24d, being positioned at a center rear portion of the floor 22. The stop post 36 provides a rearward mechanical stopping means to the hay/bale 110 during loading (see FIG. 4). The stop post 36 also provides an attachment means to distal end portions of the first 70a and second 70b rotating support arms via respective first hinge portions 38 being welded or otherwise permanently affixed to said stop post 36. The first hinges 38 allow angular positioning of the rotating support arms 70a, 70b along a horizontal plane subjacent to the roof platform 26, thereby enabling the rotating support arms 70a, 70b to be rotated such that said rotating support arms 70a, 70b may be positioned adjacent to each other or rotated outwardly. Each first 70a and second 70b rotating support arm comprises a length of UNI-STRUT® or similar structural member providing a slot 76 along a bottom surface suitable to receive respective first latch post 72a and second latch post 72b portions. Each latch post 72a, 72b comprises welded portions including an angled brace member 74 and a "T"-shaped first sliding plate 75a. Each first sliding plate 75a is positioned perpendicularly along a top portion of the latch post 72a, 72b enabling sliding insertion into the rotating support arms 70a, 70b (see FIGS. 4 and 8a). Said latch posts 72a, 72b are directed vertically downward having bottom end portions being positioned slightly above the floor 22 and are abutted against and positioned by a wooden stationary block 78 mounted to the floor 22. The latch posts 72a, 72b provide an attachment means to proximal vertical edges of respective first 100a and second 100b fence sections using a plurality of fasteners 105 such as nuts and bolts. Outward rotation of the rotating support arms 70a, 70b and affixed latch posts 72a, 72b provides frontal clearance to allow a user to insert a hay/bale 110 into the apparatus 10 until the hay/bale 110 is positioned against the stop post 36. Once the hay/bale 110 is in position, the first 70a and second 70b rotating support arms may be rotated inwardly until the latch posts 72a, 72b abut the stationary block 78. The edge portions of the fence sections 100a, 100b, being affixed to the latch posts 72a, 72b, may then be joined together using a plurality of latching clips 107, thereby encompassing and containing the hay/bale 110 within. The second fence section 100b is shown in FIG. 1 extending approximately six inches (6 in.) beyond the attachment to the second latch post 72b to provide an overlapping of the fence sections 100a, 100b, thereby facilitating attachment of said fence sections 100a, 100b using the latching clips 107 as seen in FIG. 2.

The lateral support bar 80 is affixed to the roof platform 26 via at least one (1) offset block 83, preferably a pair of offset blocks 83 on opposing distal ends thereof. The lateral support bar 80 provides a hinging attachment means to the third 84a and fourth 84b rotating support arms via respective second hinge portions 86 being welded or otherwise permanently affixed to an intermediate location along a rear surface of the lateral support bar 80. The second hinges 86 allow angular positioning of the third 84a and fourth 84b rotating support arms along a horizontal plane from a rearward adjacent position to an opposing outward position. Each third 84a and fourth 84b rotating support arm comprises a length of UNI-STRUT® or similar structural member providing a slot 76 along a bottom surface suitable to slidingly receive a "T"-shaped second sliding plate 75b portion of a respective hook assembly portion 82. Each hook assembly 82 engages and supports a side portion of a respective fence section 100a, 100b being capable of motioning rearwardly and inwardly via the third 84a and fourth 84b rotating support arms and the second sliding plates 75b as the hay/bale 110 reduces in size (see FIGS. 4 and 8b).

The stop post 36 also provides a welded attachment means to a pair of stationary support arms 81 which divergently extend horizontally outward at an approximate angle of forty-five degrees (45°) to each other, being welded to the lateral support bar 80. The stationary support arms 81 are positioned subjacent to, and provide mechanical support to, the previously described third 84a and fourth 84b rotating support arms as they rotate.

The actual width and height dimensions of the shelter assembly portion 20 of the apparatus 10 are envisioned to accommodate a wide variety of sizes of large round hay/bales 110, being scaled up or down accordingly without deviating from the teachings of the present invention, and as such should not be interpreted as a limiting factor of the apparatus 10.

Figure 3A:
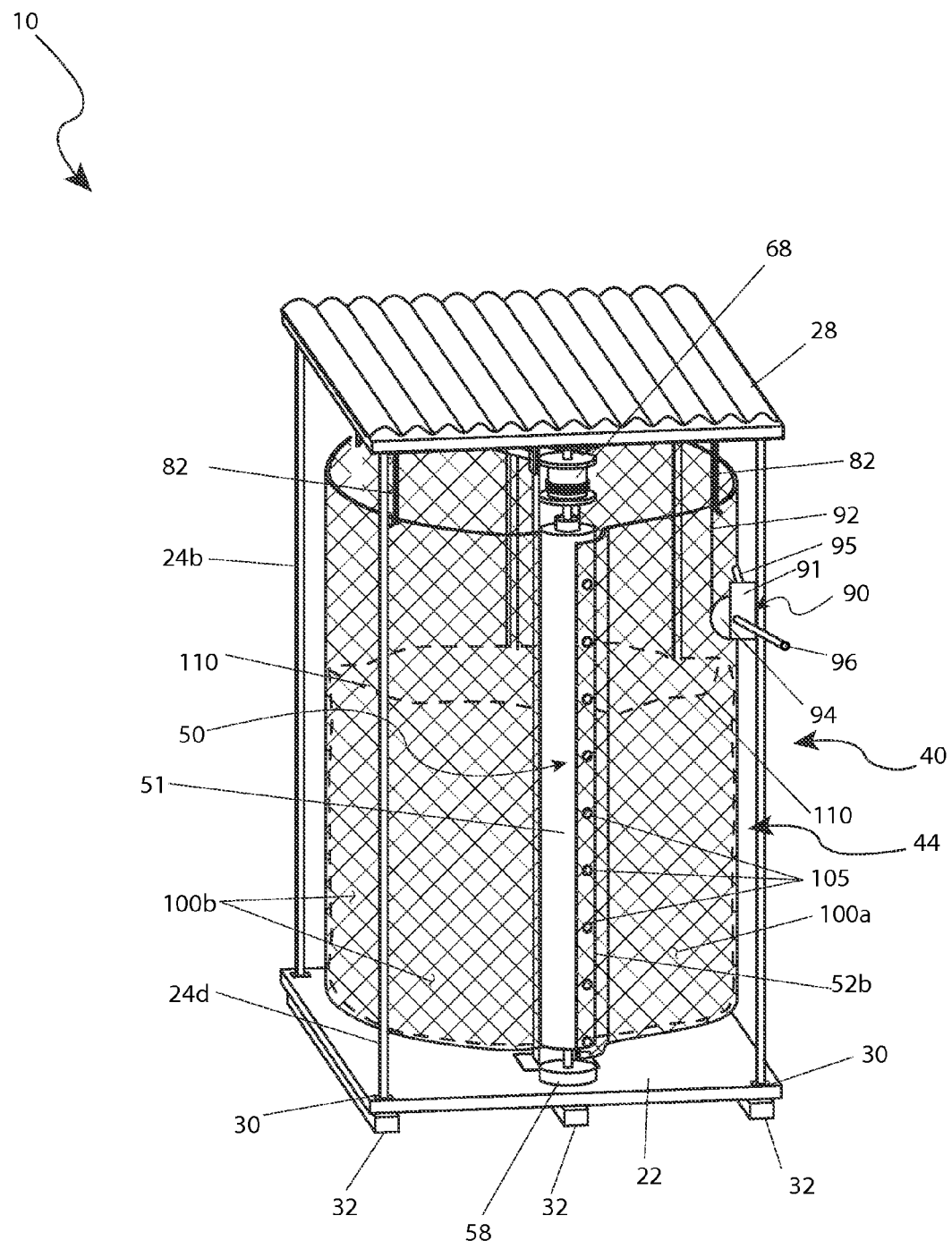
FIG. 3a is a rear perspective view of the hay bale holder 10 from above, according to a preferred embodiment of the present invention.
Figure 3B:
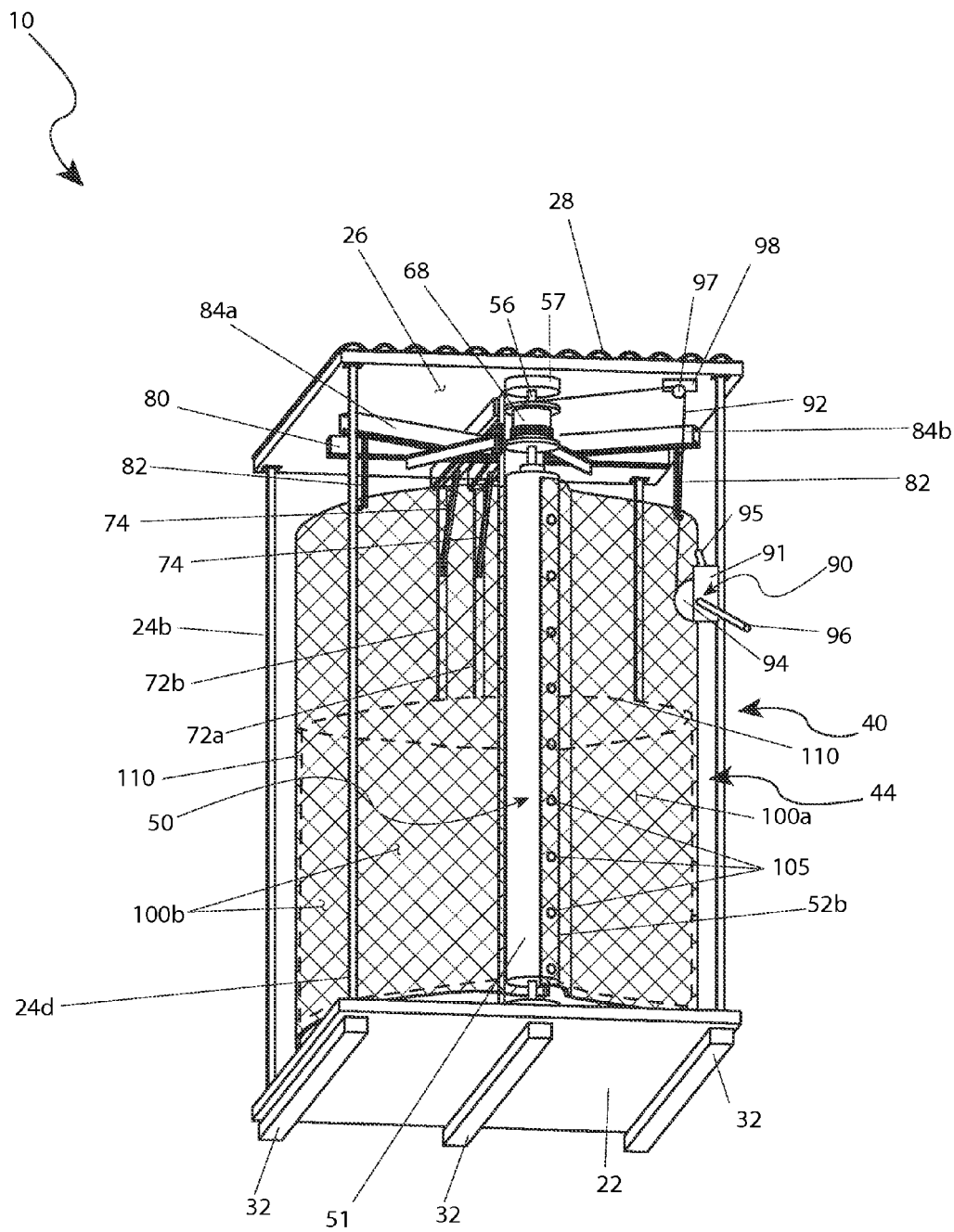
FIG. 3b is a rear perspective view of the hay bale holder 10 from below, according to a preferred embodiment of the present invention.
Figure 4:
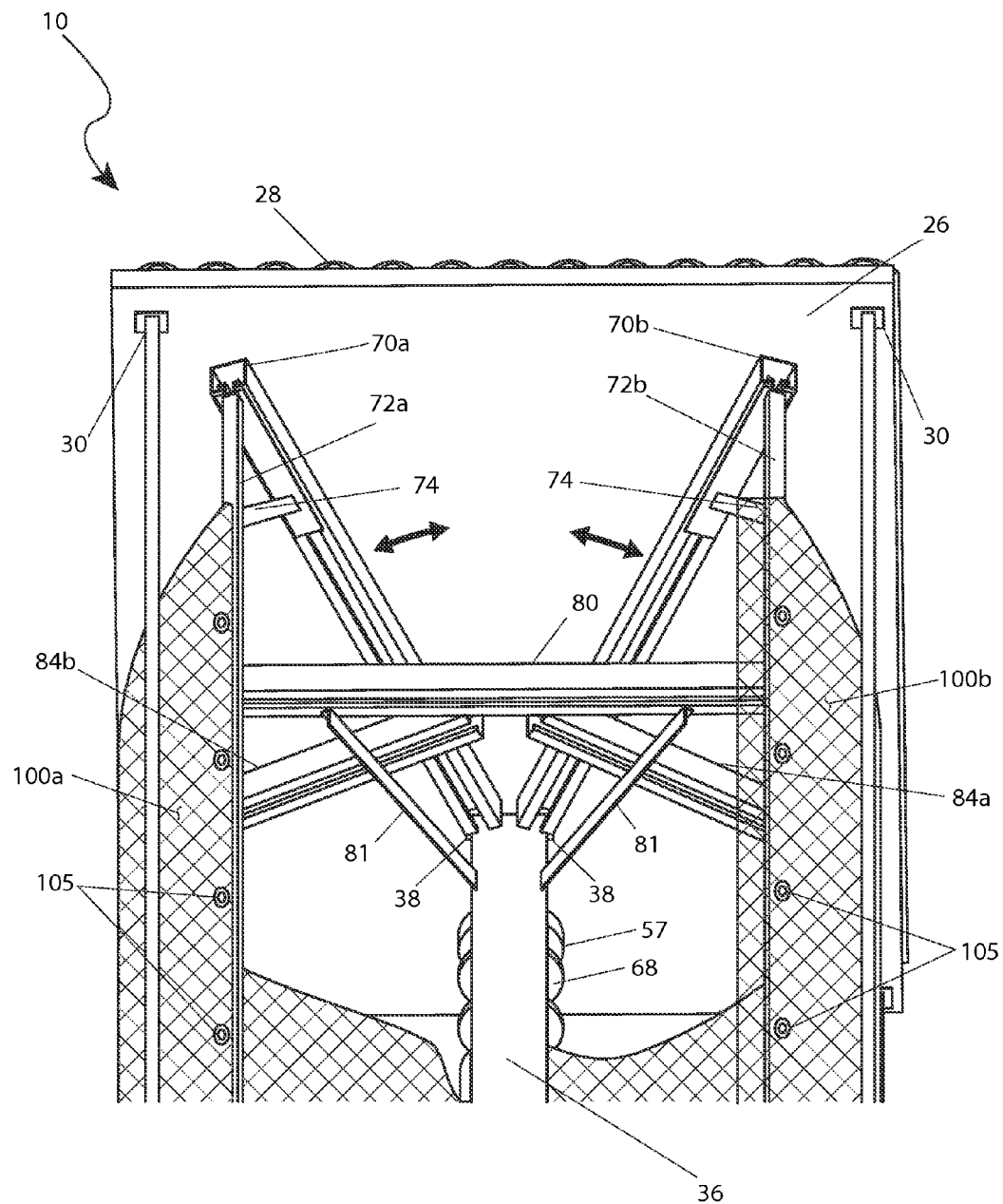
FIG. 4 is a partial front view of the hay bale holder 10 from below depicting an open and unloaded state, according to a preferred embodiment of the present invention.

Referring now to FIGS. 3a and 3b, a rear perspective view of the apparatus 10, according to a preferred embodiment of the present invention, is disclosed. The hay supporting assembly 40 includes fence sections 100a and 100b. The distal edge portions of the fence sections 100a, 100b are attached to the wind-up torsion tube assembly 50 positioned immediately behind the stop post 36. These are fastened using a plurality of fasteners 105 such as lag-screws or bolts. The distal vertical edges of the fence sections 100a, 100b are attached to side surfaces of a torsion tube 51 of the wind-up torsion tube assembly 50 via respective fastener plates 52a, 52b and fasteners 105. Each fastener plate 52a, 52b comprises a strip of steel flat stock approximately one inch (1 in.) in width and having a plurality of equally-spaced drilled holes into which the fasteners 105 are installed. The torsion tube 51 is envisioned being made of plastic (PVC) or metal pipe. The spring-loaded rotating function of the wind-up torsion tube assembly 50 gathers the fence sections 100a, 100b around the torsion tube 51, thereby automatically tightening the fence sections 100a, 100b around the hay/bale 110 as said hay/bale 110 is consumed (also see FIGS. 5 and 6).

The apparatus 10 comprises a winch assembly 90 affixed to a rearward support post 24c, 24d of the shelter assembly 20. The winch assembly 90 provides an extending cable portion 92 which is connected to a cable pulley portion 68 of the wind-up torsion tube assembly 50 to provide a means to wind an internal torsion spring portion 53 (see FIGS. 2, 3 & 5-7). The winch assembly 90 is envisioned to comprise a commercially-available hand-cranked unit further comprising a winch bracket 91, a take-up winch pulley 94, a locking lever 95, and a crank handle 96.

Figure 5:
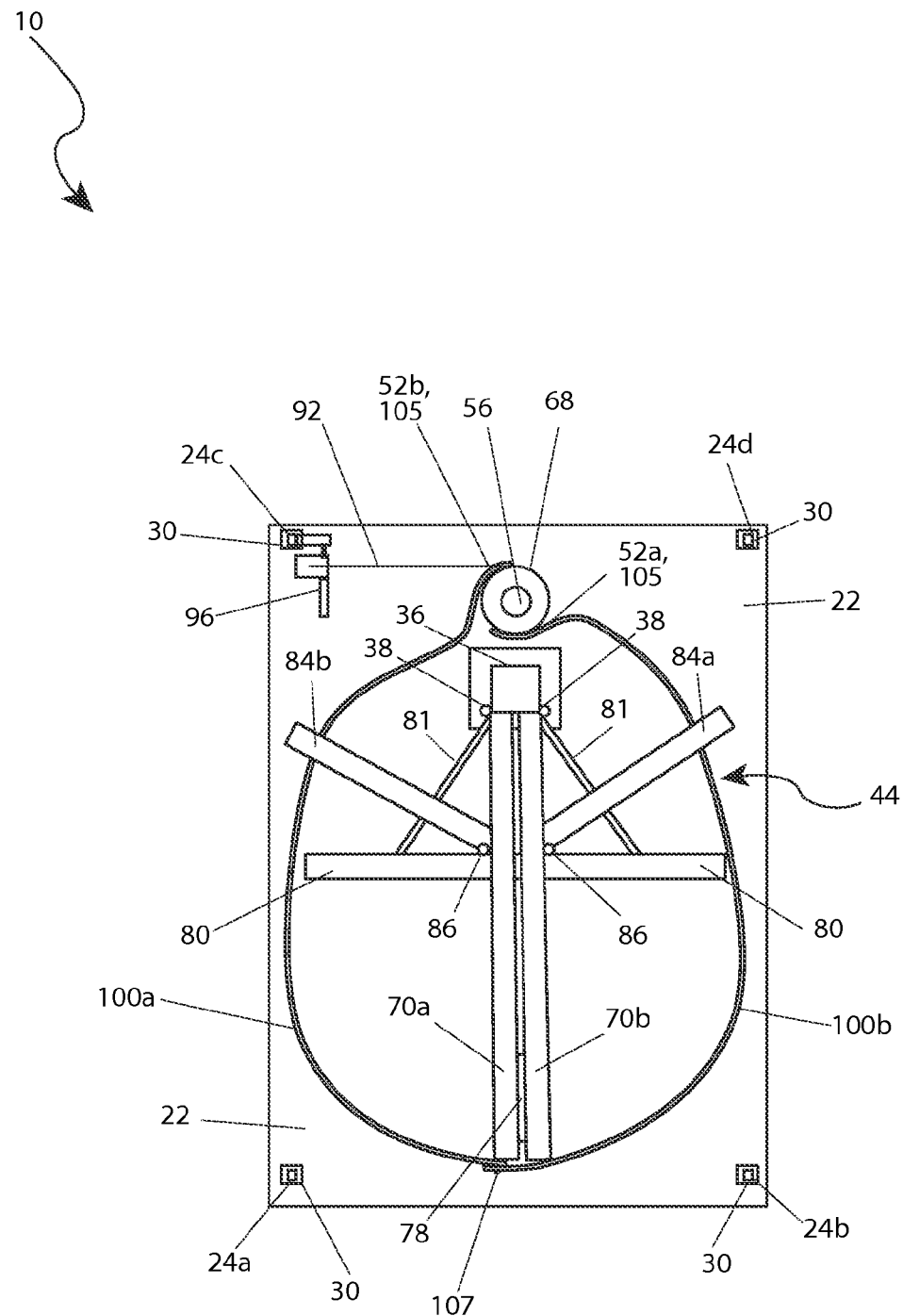
FIG. 5 is a top view of the hay bale holder 10 depicting an loaded state, according to a preferred embodiment of the present invention.
Figure 6:
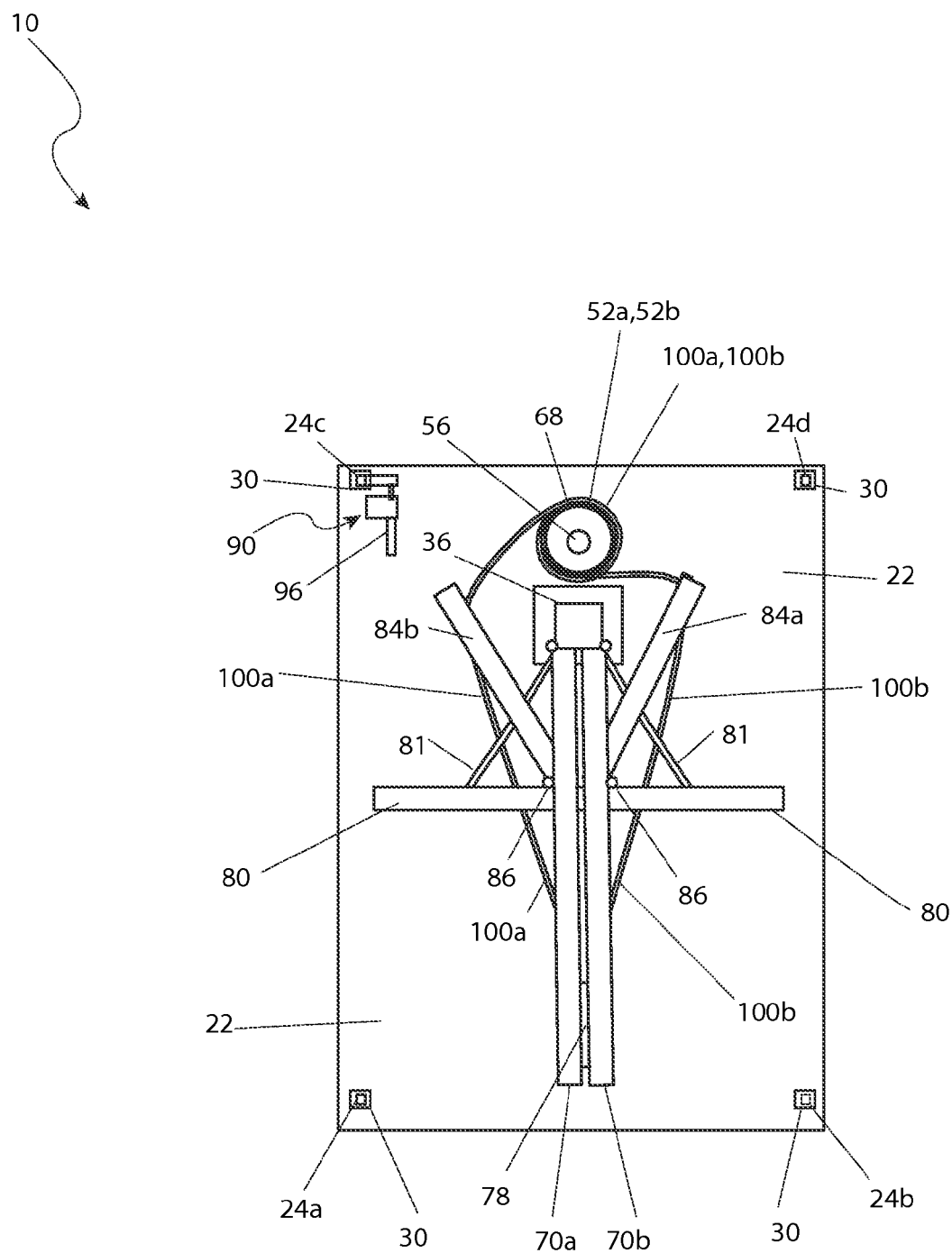
FIG. 6 is a top view of the hay bale holder 10 depicting an contracted state, according to a preferred embodiment of the present invention.

Referring now to FIGS. 5 and 6, top views of the apparatus 10 depicting loaded and contracted states, according to a preferred embodiment of the present invention, are disclosed. This view illustrates a new hay/bale 110 being held in position by the stop post 36 and the fence sections 100a, 100b with the rotating support arms 70a, 70b and latch post portions 72a, 72b at a forward position and being attached using the latching clips 107. Additionally, the third 84a and fourth 84b rotating support arms and respective hook assemblies 82 are positioned to support the fence sections 100a, 100b along opposing side portions of the hay/bale 110. As the hay/bale 110 is consumed, the spring-loaded wind-up torsion tube assembly 50 applies a take-up tension upon the fence sections 100a, 100b, keeping said fence sections 100a, 100b pressing against the hay/bale 110 until the hay/bale 110 is completely consumed as seen in FIG. 6.

Figure 7:
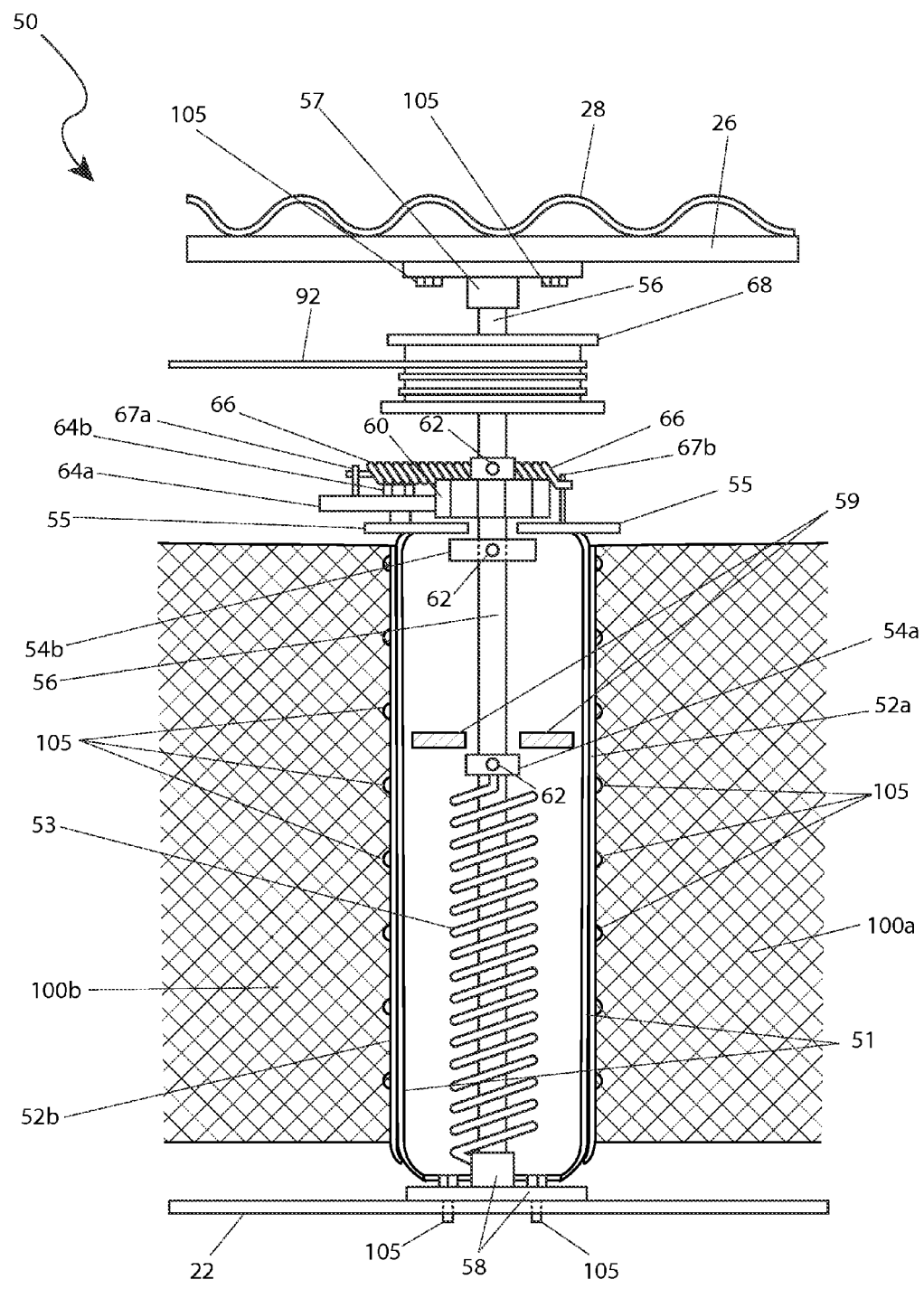
FIG. 7 is a cross-sectional view of a wind-up torsion tube assembly portion 50 of the hay bale holder 10, according to a preferred embodiment of the present invention.

Referring now to FIG. 7, a cross-sectional view of the wind-up torsion tube assembly portion 50 of the apparatus 10, according to a preferred embodiment of the present invention, is disclosed. The wind-up torsion tube assembly 50 comprises a cylindrical torsion tube 51, an internal tension spring 53, a first shaft collar 54a, a second shaft collar 54b, a shaft 56, an upper bearing 57, a lower bearing 58, a centering disc 59, a sprocket 60, a locking lever arm 64a, a spring 66, and a cable pulley 68. The components of the wind-up torsion tube assembly 50 are mounted upon the shaft 56 which is rotatingly connected to the floor 22 and roof platform 26 portions of the shelter assembly 20 via a lower bearing 58 and upper bearing 57 respectively. As previously mentioned, the wind-up torsion tube assembly 50 provides a means to attach the first 100a and second 100b fence sections to the torsion tube 51 via a first fastener plate 52a and a second fastener plate 52b being affixed to opposing surfaces of the cylindrical torsion tube 51 using fasteners 105 such as screws, rivets, or the like.

A portion of the shaft 56 within the torsion tube 51 is encompassed by the torsion spring 53. An upper end of the torsion spring 53 is fixedly attached to a first shaft collar 54a mounted to an intermediate portion of the shaft 53 using a dowel pin 62. A bottom end of the torsion spring 53 is fixedly attached to the lower bearing 58. The cable pulley 68 is also fixedly attached to a portion of the shaft 56 just above the torsion tube 51. The winch assembly 90 provides a means to collect a length of cable 92 from the cable pulley 68 causing rotation of the shaft 56, thereby winding the torsion spring 53. Following winding of the torsion spring 53, the shaft 56 is mechanically coupled with the torsion tube 51 via respective engaging sprocket 60 and locking lever arm 64a portions which act to transfer the static torsion of the spring 53 to the torsion tube 51 and subsequently apply tension upon the fence sections 100a, 100b.

The sprocket 60 is fixedly mounted to the shaft 56 via a dowel pin 62 or similar non-rotating device. The torsion tube 51 comprises an integral locking mechanism plate 55 being permanently attached to a circular top surface. The locking mechanism plate 55 comprises a flat circular plate having a center aperture portion to accommodate upper egress of the shaft 56. The locking mechanism plate 55 provides rotary attachment of the locking lever arm 64a via a lever arm fastener 64b such as a shoulder bolt or the like. The locking lever arm 64a is biased against the sprocket 60 by a tension spring 66 which is anchored to the locking lever arm 64a and to the locking mechanism plate 55 portions by first spring post 67a and second spring post 67b portions, respectively. The locking lever arm 64a comprises a length of rectangular bar stock which extends outwardly allowing a user to motion said locking lever arm 64a to mechanically disengage the torsion tube 51 from the torsion spring 53, thereby allowing independent rotation of the torsion tube 51 to manually feed out the fence sections 100a, 100b from the wind-up torsion tube assembly 50 during the loading of a new hay/bale 110.

The shaft 56 provides a means to support and position the torsion tube 51 via a second shaft collar 54b. The second shaft collar 54b is affixed to the shaft 56 using a dowel pin 62 so as to support the locking mechanism plate portion 55 of the torsion tube 51 to position a bottom edge of the torsion tube 51 slightly above the floor 22. Additionally, the shaft 56 comprises a centering disc 59 which rests upon the first shaft collar 54a. The centering disc 59 comprises an outer diameter being slightly smaller than that of the inner diameter of the torsion tube 51, thereby acting to center the torsion tube 51 laterally with regards to the shaft 56.

Figure 8A:
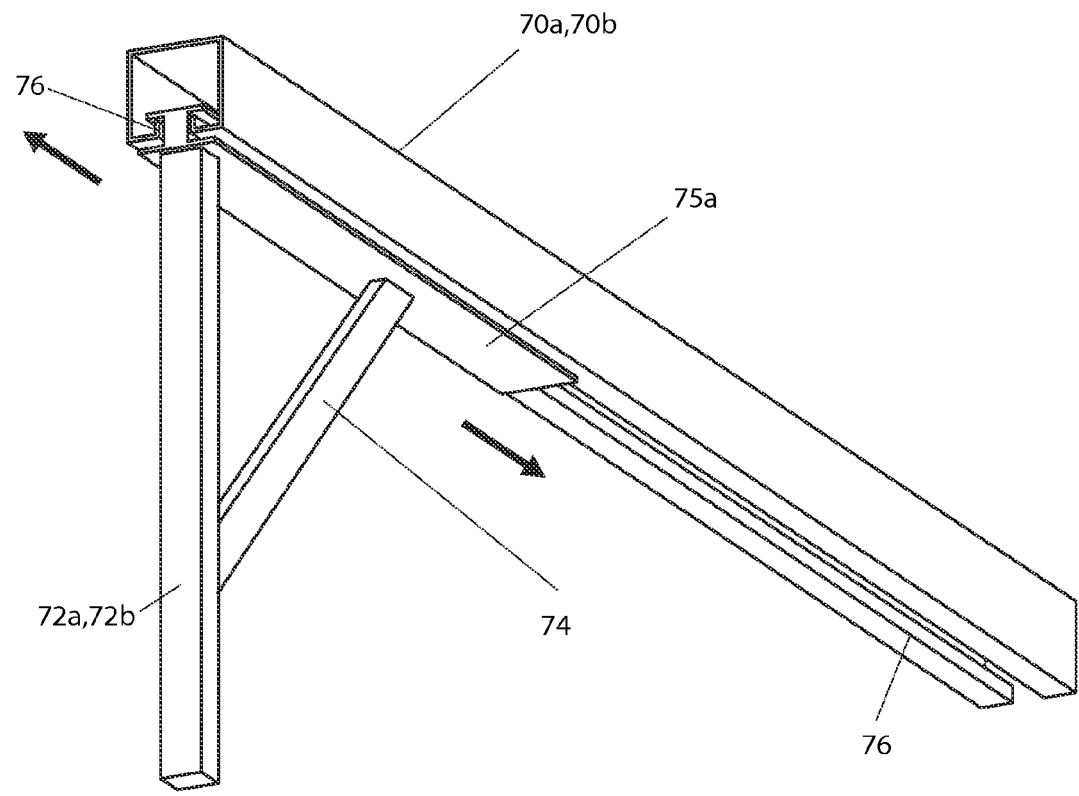
FIG. 8a is a break-away view of latch post portions 72a, 72b of the hay bale holder 10, according to a preferred embodiment of the present invention; and, FIG. 8b is a break-away view of a hook assembly portion 82 of the hay bale holder 10, according to a preferred embodiment of the present invention.

Referring now to FIG. 8a, a break-away view of latch post portions 72a, 72b of the apparatus 10, according to a preferred embodiment of the present invention, is disclosed. The rotating support arms 70a, 70b comprise respective sliding first latch post 72a and second latch post 72b portions. The fence sections 100a, 100b along with the stop post 36, the latch posts 72a, 72b, and the hook assemblies 82, define a self-adjusting cylindrical enclosure to position and contain the hay/bale 110 during feeding. As the hay/bale 110 is consumed and reduces in size, the tension upon the fence sections 100a, 100b acts to slidingly motion the latch posts 72a, 72b inwardly.

Each of the latch posts 72a, 72b are slidingly attached to the respective rotating support arm 70a, 70b via a first sliding plate 75a. Each first sliding plate portion 75a is welded perpendicularly to a top portion of a latch post 72a, 72b being supported by an interconnecting brace member 74. The latch posts 72a, 72b and corresponding brace members 74 extend downwardly from the first sliding plate portion 75a through slot portions 76 along a bottom surface of the support arms 70a, 70b.

Figure 8B:
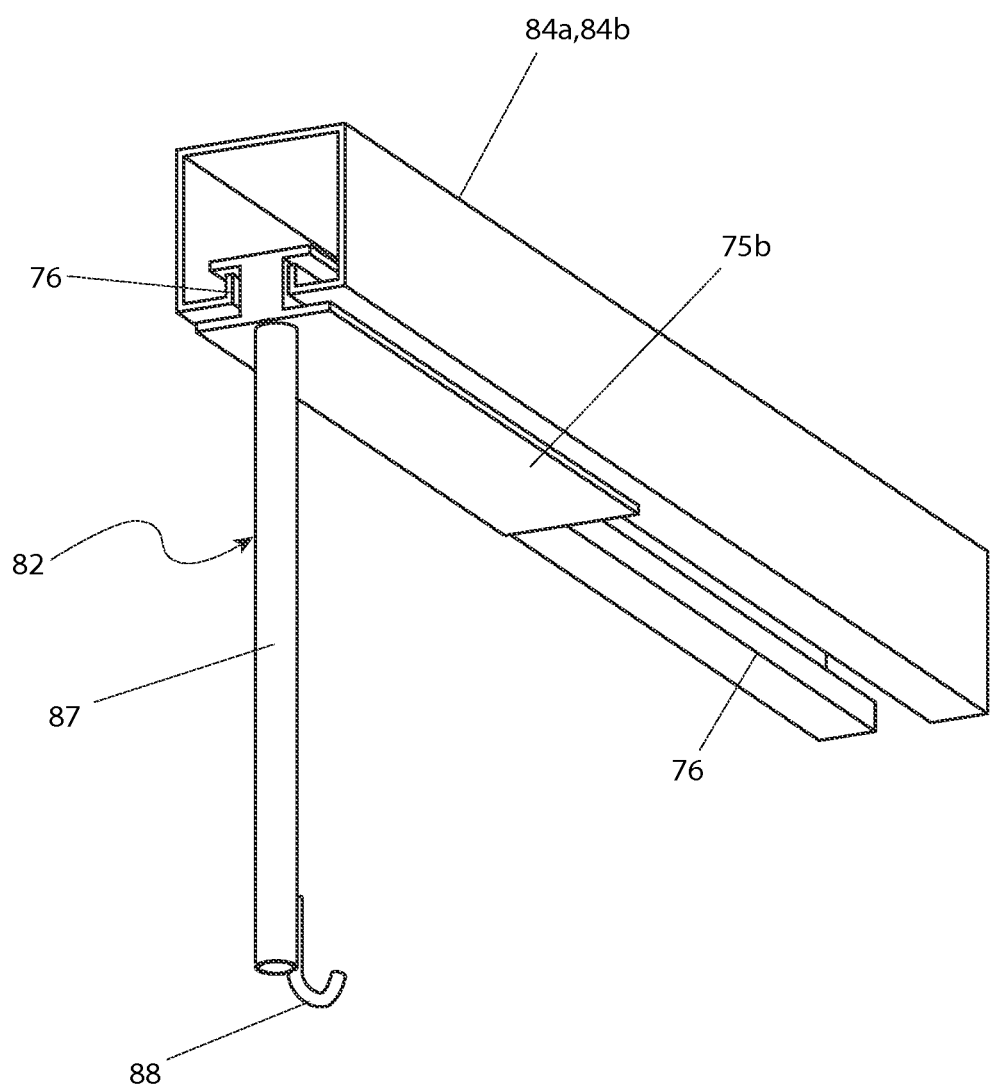

Referring now to FIG. 8b, a break-away view of a hook assembly portion 82 of the apparatus 10, according to a preferred embodiment of the present invention, is disclosed. In a similar manner as the previously described latch posts 72a, 72b, the third 84a and fourth 84b rotating support arms comprise a length of UNI-STRUT® or similar structural member providing a slot 76 along a bottom surface suitable to slidingly receive a "T"-shaped second sliding plate 75b portion of a hook assembly portions 82. Each hook assembly further comprises welded portions including a horizontal second sliding plate 75b, a vertical member 87, and a hook 88. The second sliding plate 75b slides within a slot portion 76 of the rotating support arm 84a, 84b. Each second sliding plate 75b comprises a vertical member 87 welded thereto and extending downwardly approximately one foot (1 ft.), and having the hook 88 welded to an inside surface. The vertical member 87 is preferably a length of pipe or other structurally equivalent member. The hook 88 comprises a "U"-shaped section of round bar stock with an upwardly turned end portion being suitable for passing through and supporting the fence sections 100a, 100b.

It is envisioned that other styles and configurations of the present invention can be easily incorporated into the teachings of the present invention, and only one particular configuration shall be shown and described for purposes of clarity and disclosure and not by way of limitation of scope. The preferred embodiment of the present invention can be utilized by the common user in a simple and effortless manner with little or no training. After initial purchase or acquisition of the apparatus 10, it would be installed as indicated in FIGS. 1 through 3.

The method of installing and utilizing the apparatus 10 may be achieved by performing the following steps: procuring the apparatus 10; placing the apparatus 10 upon a generally flat ground surface; engage locking lever 95 and turn the winch assembly 90 a few turns to disengage the locking lever 64a; pressing upon the locking lever arm 64a to uncouple said locking lever arm 64a from the sprocket 60 to enable the winding torsion tube 50 to rotate freely and allow the fence sections 100a, 100b to unwind; slidingly extending the latch posts 72a, 72b, and fence sections 100a, 100b outwardly; engaging the hook portions 88 of each hook assembly to an upper side edge of a respective fence section 100a, 100b; spreading the rotating support arms 70a, 70b apart out to their mechanical limit; inserting the hay/bale 110 into a front portion of the shelter assembly 20; sliding the hay/bale 110 into the shelter assembly 20 until the hay/bale 110 contacts the stop post 36; rotating the rotating support arms 70a, 70b together until contacting the stationary block 78 to encircle the hay/bale 110 within the fence sections 100a, 100b; connecting the overlapping edges of the fence sections 100a, 100b using a plurality of latching clips 107; holding the handle on the winch assembly 90; releasing the locking lever portion 95 of the winch assembly 90, and slowly turning backwards to allow the force of the torsion spring 53 to rotate the torsion tube 51 and pull the fence sections 100a, 100b, and subsequently the latch posts 72a, 72b and hook assemblies 82, against the hay/bale 110; allowing farm animals to feed upon the hay/bale 110; allowing the fence sections 100a, 100b to wind around the torsion tube 51 and reduce in diameter as the hay/bale 110 is consumed; and, benefiting from reduced waste of the hay/bale 110 during feeding afforded a user of the present invention 10.

The method of loading a new hay/bale 110 into the apparatus 10 may be achieved by performing the following steps: engaging the locking lever 95 and turning the winch assembly 90 a few turns to disengage the locking lever 64a; pressing upon the locking lever arm 64a to uncouple said locking lever arm 64a from the sprocket 60 to enable the winding torsion tube 50 to rotate freely and allow the fence sections 100a, 100b to unwind; slidingly extending the latch posts 72a, 72b, and fence sections 100a, 100b outwardly; spreading the rotating support arms 70a, 70b apart out to their mechanical limits; inserting and securing a new hay/bale 110 into a front portion of the shelter assembly 20 as previously described; holding the handle on the winch assembly 90 to release the locking lever portion 95 of the winch assembly 90 and slowly turn backwards to restore the force of the torsion spring 53 to the torsion tube 51 to pull the latch posts 72a, 72b, and fence sections 100a, 100b against the hay/bale 110; and, winding the torsion spring 53, as needed, to obtain a desired amount of tension upon the fence sections 100a, 100b, as previously described. Alternate embodiments of the present invention 10 are envisioned to comprise various overall width and height dimensions which correspond to particularly sized large round hay/bales 100.

The foregoing embodiments of the disclosed hay bale feeder have been presented for purposes of illustration and description. They are not intended to be exhaustive or to limit the invention and method of use to the precise forms disclosed. It can be appreciated by one skilled in the art that other styles, configurations, and modifications of the invention can be incorporated into the teachings of the present disclosure upon reading the specification and that the embodiments shown and described are for the purposes of clarity and disclosure and to limit the scope. The embodiments have been chosen and described in order to best explain the principles and practical application in accordance with the invention to enable those skilled in the art to best utilize the various embodiments with expected modifications as are suited to the particular use contemplated. The present application includes such modifications and is limited only by the scope of the claims.

The invention claimed is:

1. A hay bale holder, comprising:
a weather-resistant shelter assembly, comprising:
  a floor platform having a plurality of spacers;
  a roof platform:
  a plurality of support posts disposed between and attached to said roof and said floor platform; and,
  a roof covering mounted on a top surface of said roof platform;
a hay supporting assembly disposed within said shelter assembly and adapted to encompass and support a bale of hay to allow for consumption, further comprising:
  a stop post mounted to a central portion of said shelter assembly between said floor and said roof platforms;
  a first rotating support arm hingedly attached to said stop post;
  a second rotating support arm hingedly attached to said stop post;
  a lateral support bar affixed to an underside surface of said roof platform;
  a third rotating support arm hingedly attached to said lateral support bar;
  a fourth rotating support arm hingedly attached to said lateral support bar;
  a pair of stationary support arms each attached at a distal end to said stop post and at a proximate end to said lateral support bar; and,
  a fence assembly; and,
a wind-up assembly disposed within said hay supporting assembly and adapted to provide continual tension on said hay supporting assembly as said bale of hay is consumed;
wherein said fence assembly is attached to said wind-up assembly and configured to support and retain said bale of hay therein.

2. The holder of claim 1, wherein said fence assembly further comprises:
a first fence section and a second fence section;
a first latch post affixed to a proximate end of said first fence section and slidably engaging said first rotating support arm;
a first hook assembly affixed to an upper portion of said first fence section and slidably attached to said third rotating support arm;
a second latch post affixed to a proximate end of said second fence section and slidably engaging said second rotating support arm; and,
a second hook assembly affixed to an upper portion of said second fence section and slidably attached to said fourth rotating support arm;
wherein a distal end of said first fence section and a distal end of said second fence section are affixed to said wind-up assembly.

3. The holder of claim 2, wherein said wind-up assembly further comprises:
a torsion tube attached to said first and said second fence sections of said fence assembly;
a cylindrical shaft disposed within said torsion tube and operatively attached at an upper end to an upper bearing disposed on said roof platform and operatively attached at a lower end to a lower bearing disposed on said floor platform; and,
a torsion spring disposed about said cylindrical shaft and within said torsion tube, a lower end affixed to said floor platform, and an upper end affixed to said cylindrical shaft to provide torsional tension to the rotation of said shaft.

4. The holder of claim 3, wherein said wind-up assembly further comprises:
a cable pulley and a sprocket each affixed axially on said cylindrical shaft;
a locking mechanism plate affixed to said torsion tube; and,
a locking lever arm operatively attached to said locking mechanism plate;
wherein said lever arm engages said sprocket to hold said shaft rotationally in place and retain tension on said hay supporting assembly.

5. The holder of claim 4, wherein said wind-up assembly further comprises a tension spring having a distal end attached to said locking mechanism plate and a proximate end attached to said locking lever arm;
wherein said tension spring draws said locking lever arm against said sprocket.

6. The holder of claim 4, wherein said wind-up assembly further comprises a winch assembly comprising:
a winch bracket adapted to affix said winch assembly to one of said support posts;
a winch pulley operatively disposed within said winch bracket;
a handle affixed to said winch pulley and adapted to allow a user to rotate said winch pulley;

a pulley bracket affixed to an underside surface of said roof platform;
an alignment pulley operatively disposed within said pulley bracket; and,
a cable operatively strung from said winch pulley through said alignment pulley to said cable pulley;
wherein said user may selectively rotate said handle to impart rotation through said cable upon said cylindrical shaft and apply rotational torsion to said torsion tube.

7. The holder of claim 3, wherein said wind-up assembly further comprises a centering disc disposed axially upon said cylindrical shaft within said torsion tube wherein said centering disc is adapted to center said shaft within said torsion tube.

8. The holder of claim 2, wherein each said latch post further comprises a sliding plate and an angled brace member.

9. The holder of claim 2, wherein each said hook assembly further comprises a sliding plate, a vertical member, and a hook.

10. A hay bale holder, comprising:
a weather-resistant shelter assembly having a floor platform and a roof platform with a plurality of support posts disposed there between and attached thereto;
a hay supporting assembly comprising:
a stop post disposed between and attached to said floor platform and said roof platform;
a first and a second rotating support arm each hingedly attached at a distal end to said stop post;
a lateral support bar affixed to said roof platform;
a third and a fourth rotating support arm hingedly attached at a distal end to said lateral support bar;
a pair of stationary support arms each attached at a distal end to said stop post and at a proximate end to said lateral support bar; and,
a fence assembly attached to said wind-up assembly, said fence assembly configured to encompass and support a bale of hay within said shelter assembly to allow for consumption.

11. The holder of claim 10, wherein said fence assembly further comprises:
a first fence section and a second fence section;
a first latch post affixed to a proximate end of said first fence section and slidably engaging said first rotating support arm;
a first hook assembly affixed to an upper portion of said first fence section and slidably attached to said third rotating support arm;
a second latch post affixed to a proximate end of said second fence section and slidably engaging said second rotating support arm; and,
a second hook assembly affixed to an upper portion of said second fence section and slidably attached to said fourth rotating support arm;
wherein a distal end of said first fence section and a distal end of said second fence section are affixed to said wind-up assembly.

12. The holder of claim 10, further comprises a wind-up assembly comprising:
a torsion tube attached to said first and said second fence sections of said fence assembly;
a cylindrical shaft disposed within said torsion tube and operatively attached at an upper end to an upper bearing disposed on said roof platform and operatively attached at a lower end to a lower bearing disposed on said floor platform; and
a torsion spring disposed about said cylindrical shaft and within said torsion tube, a lower end affixed to said floor platform and an upper end affixed to said cylindrical shaft to provide torsional tension to the rotation of said shaft.

13. The holder of claim 12, wherein said wind-up assembly further comprises:
a cable pulley and a sprocket each affixed axially on said cylindrical shaft;
a locking mechanism plate affixed to said torsion tube; and,
a locking lever arm operatively attached to said locking mechanism plate;
wherein said lever arm engages said sprocket to hold said shaft rotationally in place and retain tension on said hay supporting assembly.

14. The holder of claim 13, wherein said wind-up assembly further comprises a tension spring having a distal end attached to said locking mechanism plate and a proximate end attached to said locking lever arm;
wherein said tension spring draws said locking lever arm against said sprocket.

15. The holder of claim 13, wherein said wind-up assembly further comprises a winch assembly comprising:
a winch bracket adapted to affix said winch assembly to one of said support posts;
a winch pulley operatively disposed within said winch bracket;
a handle affixed to said winch pulley and adapted to allow a user to rotate said winch pulley;
a pulley bracket affixed to an underside surface of said roof platform;
an alignment pulley operatively disposed within said pulley bracket; and,
a cable operatively strung from said winch pulley through said alignment pulley to said cable pulley;
wherein said user may selectively rotate said handle to impart rotation through said cable upon said cylindrical shaft and apply rotational torsion to said torsion tube.

16. The holder of claim 11, wherein each latch post further comprises a sliding plate and an angled brace member.

17. The holder of claim 11, wherein each hook assembly further comprises a sliding plate, a vertical member, and a hook.

18. A hay bale holder, comprising:
a weather-resistant shelter assembly having a floor platform and a roof platform with a plurality of support posts disposed there between and attached thereto;
a hay supporting assembly comprising:
a stop post disposed between said floor platform and said roof platform;
a first and a second rotating support arm each hingedly attached at a distal end to said stop post;
a first and a second latch post slidably engaged in said first and said second rotating support arms respectively;
a lateral support bar affixed to said roof platform;
a third and a fourth rotating support arm hingedly attached at a distal end to said lateral support bar;
a first and a second hook assembly slidably engaged in said third and said fourth rotating support arms respectively;
a pair of stationary support arms each attached at a distal end to said stop post and at a proximate end to said lateral support bar;
a fence assembly attached to said first and said second latch posts and said first and said second hook assemblies, said fence assembly configured to encompass and support a bale of hay within said shelter assembly to allow for consumption; and, a wind-up assembly disposed within said hay supporting assembly and adapted to provide continual tension on said hay supporting assembly as said bale of hay is consumed.

\* \* \* \* \*